Oct. 13, 1942. J. L. JONES 2,299,020
VEGETABLE PEELING APPARATUS
Filed July 6, 1940
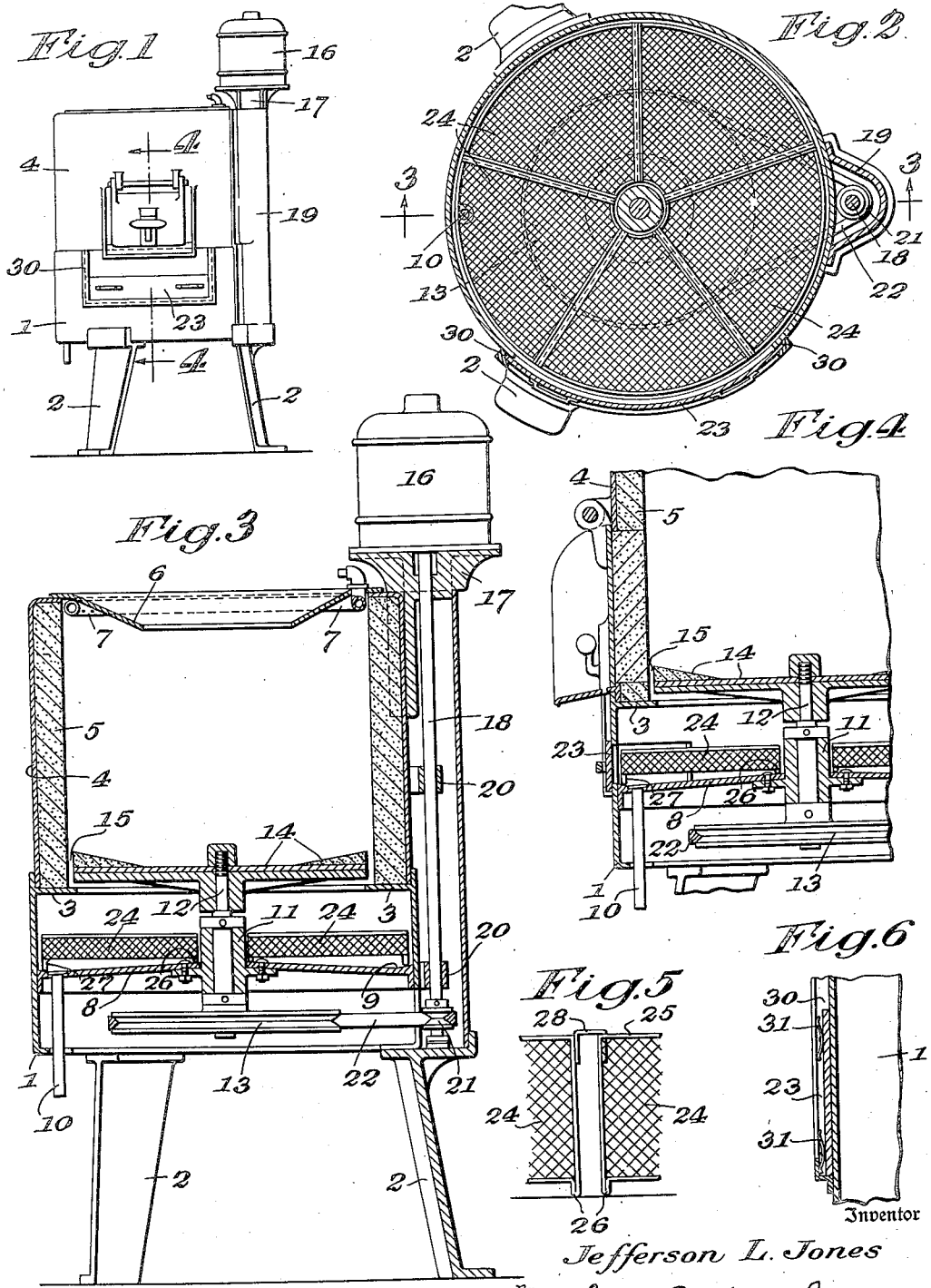
Inventor
Jefferson L. Jones
By Spear, Rawlings & Spear
Attorneys Patented Oct. 13, 1942

2,299,020

UNITED STATES PATENT OFFICE 2,299,020

VEGETABLE PEELING APPARATUS

Jefferson L. Jones, Brookline, Mass.

Application July 6, 1940, Serial No. 344,252

19 Claims. (Cl. 146—50)

My present invention relates to improvements in apparatus for peeling vegetables.

While my invention is well adapted for use with different types of apparatus, it will be found helpful to consider it in relation to that type of apparatus having an abrasive coated chamber in which there is a motor driven disc. Vegetables in the chamber are subjected to a spray which carries off peelings and like particles through the drainage port defined by the periphery of the disc and the chamber wall. Because peelings and the like must generally separately be disposed of, traps for the peelings are often used.

Apparatus of this type has proved both convenient and efficient, although the control of the drainage presents problems that have limited their wider acceptance. In practice, an appreciable quantity of peelings or like particles was deposited on the drainage surfaces intermediate the drainage port and the peeling trap. These surfaces were not accessible and the residual particles were removed therefrom only with difficulty, particularly if not regularly cleansed.

In accordance with my invention, I have provided peeling apparatus with the trap for the peelings located immediately below the drainage port. The peeling trap is made of quickly detachable sections that can be inserted or removed through a door and assembled to establish a circular trap under the circular drainage port and around the hub in support of the shaft for the disc.

In addition to the greatly increased effectiveness of the peeling trap, and the ease with which the interior surfaces may be maintained thoroughly clean, my invention makes possible a more compact device without any substantial increase in cost.

In the accompanying drawing, I have illustrated an embodiment of my invention as installed in typical apparatus.

In the drawing:

Fig. 1 is a front view of vegetable peeling apparatus.

Fig. 2 is a view in cross section showing the installed peeling trap.

Fig. 3 is a vertical section of the apparatus shown in Fig. 1 taken along the line 3—3 of Fig. 2.

Fig. 4 is an enlarged fragmentary vertical section along the lines 4—4 of Fig. 1.

Fig. 5 is a fragmentary view showing one type of interlock for the trap sections, and Fig. 6 shows details of door construction.

In the drawing, I have indicated at 1 a base having supporting legs 2. The base 1 includes a shoulder 3 to support the cylindrical chamber 4 carrying an abrasive coating 5. At 6, I have shown a hopper-like cover under which is located the spray head 7 adapted to be connected to any convenient water source.

In the base 1, I mount a floor 8 of generally conic section, but formed adjacent its periphery with a gutter 9. At 10 I have indicated a fragment of the drain pipe from the gutter 9 adapted to be connected to the sewer.

Centrally of the floor 8, I have shown a hub 11 for the shaft 12 carrying at its lower end the pulley 13 and at its top end the grinding disc 14 adjacent the bottom part of the chamber 4. The grinding disc 14 fits freely within the grinding chamber just above the shoulder 3 with the space 15 between it and the wall defining the drainage passage for water and peelings and like particles carried thereby from the peeling chamber.

The motor 16 is preferably mounted on a bracket 17 carried by the wall 4. The motor shaft 18 is within a housing 19 and while I have indicated bearings 20, oil cups and the like are omitted to simplify the drawing. The shaft 18 carries at its lower end a pulley 21 connected to the pulley 13 by a belt 22. Gears may, of course, be used in place of the pulley drive. At 23, I have shown a door permitting access to the chamber defined by the grinding disc and the floor 8.

My peeling trap consists of substantially sector-shaped wire sections 24 of relatively fine mesh adapted to establish on assembly a cylindrical trap to fill in the space between the hub 11 and the wall of the base 1. The sections 24 are identical and each includes a wire or like frame 25 formed to establish legs 26 and 27 preferably with the legs 27 being sufficiently longer than the legs 26 to support the trap level on the floor 8. It is preferable that the trap be spaced from the floor 8 to expedite the flow of the water into the drain 10.

As shown most clearly in Figs. 2 and 5, each of the sections 24 is adapted to be detachably connected to adjacent sections and to seal the space between them. One of the adjacent edges of adjacent sections may be provided with a depending flange member 28 to fit over the adjacent edge of the other adjacent section. Preferably, the flange members 28 seal the space between the sections. By this construction, the sections 24 may be shifted into position to permit their separation for removal through the door 23 or through the peeling chamber after the grinding disc 14 has been removed and assembled within the base 1 around the hub 11 and under the drainage port 15. The door 23 also permits the interior to be flushed or aired out, thus ensuring that the apparatus is always fit for use.

The door 23 is slidable in marginal channel guides 30 carried by the base 1 and carries spring keepers 31 by which the entrance into the peeling trap compartment is maintained tightly closed and by which the door 23 is maintained in any adjusted position.

In accordance with my invention, I am thus able to provide a simple and effective peeling trap without materially altering present structures. The effectiveness of the trap and the compactness of apparatus embodying it eliminate the difficulties experienced with other types of apparatus.

What I therefore claim and desire to secure by Letters Patent is:

1. In vegetable peeling apparatus or the like having a pelling chamber, horizontally revolvable peeling means in said chamber, a second chamber below said peeling chamber, and a substantially circular drainage outlet interconnecting said chambers, an annular vertically walled strainer trap in said second chamber under said drainage outlet to strain peelings and like particles from the drainage, a door to permit access to said second chamber for the removal of said strainer trap and the cleansing and airing of said second chamber, and means to seal said door against liquid leakage.

2. The apparatus of claim 1 in which the door sealing means comprise channels carried by the wall of said second chamber, and resilient means intermediate said channels and said door to urge said door against said chamber wall.

3. In vegetable peeling apparatus or the like having a peeling chamber, a second chamber, a floor in said second chamber and a substantially circular drainage outlet interconnecting said chambers, a door to permit access to said second chamber, a circular peeling strainer trap in said second chamber supported by said floor to strain peelings and like particles from drainage from said outlet, said strainer trap comprising substantially sector-shaped sections, each of said sections being removable through said door, and means to detachably interconnect said sections.

4. The device of claim 3 in which the section connecting means comprise a flange member carried by one edge of each section engageable with the adjacent edge of another section.

5. The device of claim 3 in which the section connecting means comprise a flange member carried by one edge of each section engageable with the adjacent edge of another section to seal the space therebetween.

6. In vegetable peeling apparatus or the like having a peeling chamber, horizontally revolvable peeling means in said chamber, a second chamber, and a substantially circular drainage outlet interconnecting said chambers, a floor of conic section in said second chamber, a door to permit access to said second chamber, a circular peeling strainer trap in said second chamber supported by said floor to strain peelings and like particles from drainage from said outlet, said strainer trap comprising detachable sections, each of said sections being removable through said door.

7. The device of claim 6 in which the floor has a gutter adjacent its outer edge and a drainage conduit is in communication with said gutter.

8. The device of claim 6 in which the trap is supported in a level position on said floor.

9. The device of claim 6 in which the trap is supported in a level position on said floor and spaced therefrom to ensure the free flow of liquid along said floor.

10. In vegetable peeling apparatus or the like having a peeling chamber, horizontally revolvable peeling means in said chamber, a second chamber, and a substantially circular drainage outlet interconnecting said chambers, a door to permit access to said second chamber, a circular peeling strainer trap in said second chamber to strain peelings and like particles from the drainage from said outlet, said strainer trap comprising detachable sections, and each of said sections being removable through said door.

11. Vegetable or like peeling apparatus comprising a base, a floor of conic section carried by said base, a chamber for vegetables mounted on said base, a horizontal disc in said chamber, means carried by said floor rotatably supporting said disc above the floor, means in said chamber for spraying vegetables supported therein by said disc, said disc and said chamber having abrasive coated surfaces, the space between the periphery of said disc and the chamber defining a circular drainage outlet, a door in said base permitting access to the space intermediate said disc and said floor, and a circuit peeling strainer trap carried by said floor to strain peelings from the drainage from said outlet, said peeling strainer trap comprising sections removable through said door, and means detachably interlocking said sections.

12. Vegetable or like peeling apparatus comprising a base, a floor of conic section carried by said base, a gutter adjacent the outer edge of said floor, a drain from said gutter, a chamber for vegetables mounted on said base, a horizontal disc in said chamber, means carried by said floor rotatably supporting said disc above the floor, means in said chamber for spraying vegetables supported therein by said disc, said disc and said chamber having abrasive coated surfaces, the space between the periphery of said disc and the chamber defining a circular drainage outlet, a door in said base permitting access to the space intermediate said disc and said floor, and a circular peeling strainer trap carried by said floor to strain peelings from the drainage from said outlet, said peeling strainer trap comprising sections removable through said door, and means detachably interlocking said sections.

13. Vegetable or like peeling apparatus comprising a base, a support carried by said base, a chamber for vegetables mounted on said base, a horizontal disc in said chamber rotatably mounted in said support above the bottom of the chamber, means in said chamber for spraying vegetables supported therein by said disc, said disc and said chamber having grinding surfaces, the space between the periphery of said disc and the chamber defining a circular drainage outlet, a door in said base permitting access to the space below said disc, and a circular peeling strainer trap carried by said support to strain peelings from the drainage from said outlet, said strainer trap comprising a plurality of sections removable through said door, and means to detachably interlock said sections.

14. In vegetable peeling apparatus or the like having a peeling chamber, a second chamber below said peeling chamber, a removable horizontal peeling disc rotatably mounted in said peeling chamber above its bottom, the periphery of said disc and the wall of said chamber defining a substantially circular drainage outlet interconnecting said chambers, substantially circular strainer trap means in said second chamber under said drainage outlet to strain peelings and like particles from the drainage, and said strainer trap means consisting of a plurality of detachable sections removable through said peeling chamber when said disc is removed.

15. In vegetable peeling apparatus or the like having a peeling chamber, a second chamber below said peeling chamber, a horizontal peeling disc rotatably mounted in said peeling chamber above its bottom, disc rotating means in said second chamber, the periphery of said disc and the wall of said chamber defining a substantially circular drainage outlet interconnecting said chambers, substantially circular strainer trap means in said second chamber surrounding said disc rotating means to strain peelings and like particles from the drainage through said outlet, and said strainer trap means consisting of a plurality of detachable sections removable through the peeling chamber when said disc is removed from said disc rotating means.

16. A strainer trap for vegetable peeling apparatus having vertically disposed disc rotating and supporting means, said trap comprising a plurality of sections establishing on assembly a cylindrical strainer trap to encircle said means, each of said sections comprising a bottom, end and side walls, and means to detachably interconnect adjacent side walls of adjacent sections.

17. The trap of claim 16 in which the interconnecting means seal the space between adjacent sections against the entrance of peelings or the like therein.

18. The trap of claim 16 in which the interconnecting means comprise a laterally disposed flange member carried by one wall of each section, each of said flange members terminating in a downturned edge engageable with the adjacent wall of another section.

19. In vegetable peeling apparatus or the like having a peeling chamber, a second chamber below said peeling chamber, a floor for said second chamber, a horizontally rotatable disc in said peeling chamber defining therewith a circular outlet in communication with said second chamber, disc rotating and supporting means extending through said second chamber, a cylindrical strainer trap disposed in said second chamber to strain and collect peelings and the like from drainage from said circular outlet and surrounding said rotating supporting means, said trap comprising sections detachably interconnected to permit the assembly or removal of said trap around said rotating and supporting means.

JEFFERSON L. JONES.